United States Patent [19]

Scharer et al.

[11] 4,290,742
[45] Sep. 22, 1981

[54] ADJUSTABLE PELLETIZING APPARATUS

[75] Inventors: Hans R. Scharer, Woodbridge; Richard D. Antrim, Newtown; John R. Strang, Ansonia, all of Conn.

[73] Assignee: USM Corporation, Farmington, Conn.

[21] Appl. No.: 83,675

[22] Filed: Oct. 11, 1979

[51] Int. Cl.³ .............................................. B29B 1/03
[52] U.S. Cl. ..................................... 425/313; 264/142
[58] Field of Search .......................... 425/34, 313, 67; 264/142

[56] References Cited

U.S. PATENT DOCUMENTS

| | | | |
|---|---|---|---|
| 2,614,290 | 10/1952 | Street | 425/311 |
| 3,196,487 | 7/1965 | Shelling | 425/311 |
| 3,230,582 | 1/1966 | Hoffman et al. | 425/311 |
| 3,287,764 | 11/1966 | Swickard et al. | 425/311 |
| 3,292,212 | 12/1966 | Pamper | 425/311 |
| 3,317,957 | 5/1967 | Heston et al. | 425/67 |
| 3,355,767 | 12/1967 | Niemeyer | 425/313 |
| 3,599,285 | 8/1971 | Hamilton | 425/311 |
| 3,685,751 | 8/1972 | Anders | 425/311 |

Primary Examiner—Jay H. Woo
Attorney, Agent, or Firm—Donald N. Halgren; Vincent A. White

[57] ABSTRACT

Adjusting means for aligning the cutting plane of the knives and the surface of a perforated die plate of pelletizing apparatus including a ring having a wedge cross section adjustable between the mountings for the plate and the knives to vary the angular relation of said mountings.

4 Claims, 2 Drawing Figures

ADJUSTABLE PELLETIZING APPARATUS

FIELD OF THE INVENTION

This invention relates to novel improved means for adjusting the alignment of cutting knives and the surface of a perforated die plate of apparatus for pelletizing extruded plastic material.

DESCRIPTION OF THE PRIOR ART

Apparatus for pelletizing plastic material are commonly known. In such equipment, strands of plastic material are extruded through perforated die plates and are cut off into short lengths or pellets by rotating cutting knives as the strands emerge from the die plates. A typical example of such apparatus is generally described in U.S. Pat. No. 3,618,162 which also refers to the fact that to avoid rapid wear of the cutting knives and the cutting surface of the die plates it is essential that the rotating plane of the knives and die plate be substantially parallel. That patent dealt with the prevention of bulging of the die plate but made no special provision for aligning the parallelism of the knife and die planes.

It is common in such devices to provide close manufacturing tolerances to avoid misalignment. Recognizing the difficulty of maintaining close manufacturing tolerances to avoid angular misalignment U.S. Pat. No. 2,271,821 provided for a universal joint mounting for the cutting knife head for accommodation to the cutting surface of the die plate if misaligned. Another U.S. Pat. No. 3,292,212 approached the problem by driving a knife head through a flexible disc between the head and a driving flange. Various other solutions have been tried such as providing spring mountings for the knives in the cutting head as shown in U.S. Pat. Nos. 3,196,487 and 3,266,090. However, such solutions merely accommodate the misalignment and only partially solve the problem of wear inherent in such misalignment.

U.S. Pat. No. 3,355,767 comes closer to solving the misalignment problem by providing for angular adjusting of the unit in which the cutter head is journaled relative to the unit which supports the die plate. The adjustment is provided by vertically adjustable resilient supporting members. However, this provides for a resilient mounting for the knife and chamber which could result in undesirable vibration and chattering with resultant cutter and die plate damage.

Accordingly it is an object of the present invention to provide a rigid but adjustable mounting for the cutting knives by which the knife plane and the cutting surface of the die plate can be aligned.

BRIEF SUMMARY OF THE INVENTION

The present invention provides a novel means for precisely aligning the plane of rotation of cutting knives extending from one unit of a pelletizing apparatus with a surface of a die plate through which strands of plastic material are extruded from another unit. In particular a ring-like plate with a wedge cross-section interposed between the units has at least one sloping face enageable with a complementary face of one of the units. The plate is adjustable relative to the two units generally parallel to the surface of the die plate. In this manner the mating faces of the plate and one unit are offset from one another so that the one unit is angularly displaced to align the knife plane and the die plate surface into precise parallel relation.

According to one feature the pelletizing apparatus has a packing bearing through which a shaft rotatably mounting the knives extends. Angular displacement of the shaft relative to the bearing could seriously distort the resilient packing in the bearing so as to permit leakage of fluid. Accordingly, the angular displacement of the shaft is centralized at the packing of the bearing and is minimal.

DESCRIPTION OF THE PREFERRED EMBODIMENT

Figure 1:
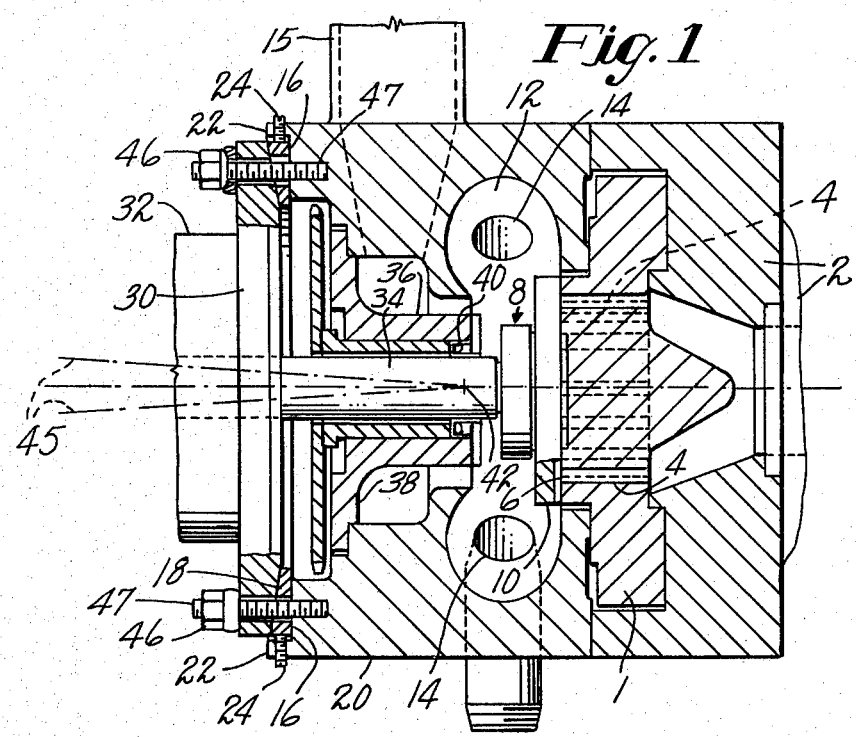
FIG. 1 is a section through the centerline of a pelletizing unit of an extruding apparatus with details of construction omitted.

Referring to FIG. 1 the pelletizing unit of the machine includes a die plate 1 secured to the discharge end of an extruder 2 so that plastic material is extruded in strands through a plurality of holes 4 to emerge from a surface 6. A cutter head 8 carries one or more knives 10 which rotate past the holes 4 so as to cut the strands of plastic into short lengths or pellets. A cooling medium such as water may be circulated through a chamber 12 from an arrangement of inlets 14 both to solidify the plastic strands and to transport the severed pellets through an outlet 15. Obviously, other means of solidifying and transporting the plastic pellets may be provided without departing from the scope of the invention to be described.

As noted in the discussion of the prior art, it is essential that the plane of rotation of the knives and the outer surface of the die plate be closely parallel to avoid undue wear on the knives and surface. To this end a ring-like plate 16 having a wedge-like cross section has a side 17 supported on a ledge 18 on a housing 20 in which the chamber 12 is formed. The housing is secured by bolts (not shown) to the extruder 2 and also secures the die plate 1. The ledge 18 may be generally parallel to the cutting surface 6 of the die plate and at its outer periphery is provided with upstanding lips 22 through which are threaded a plurality of adjustable set screws 24. The opposite side 26 of the plate 16 is in the form of a truncated cone which is complementary to a surface 28 on a mounting flange 30 of a drive unit 32 from which extends a shaft 34 mounting the cutter head 8 for rotation. A bearing sleeve 36 has a flange 38 secured to the housing 20 to seal one end of the chamber 12 against leakage. The shaft 34 passes through packing 40 which prevents leakage from the chamber around the rotating shaft.

Figure 2:
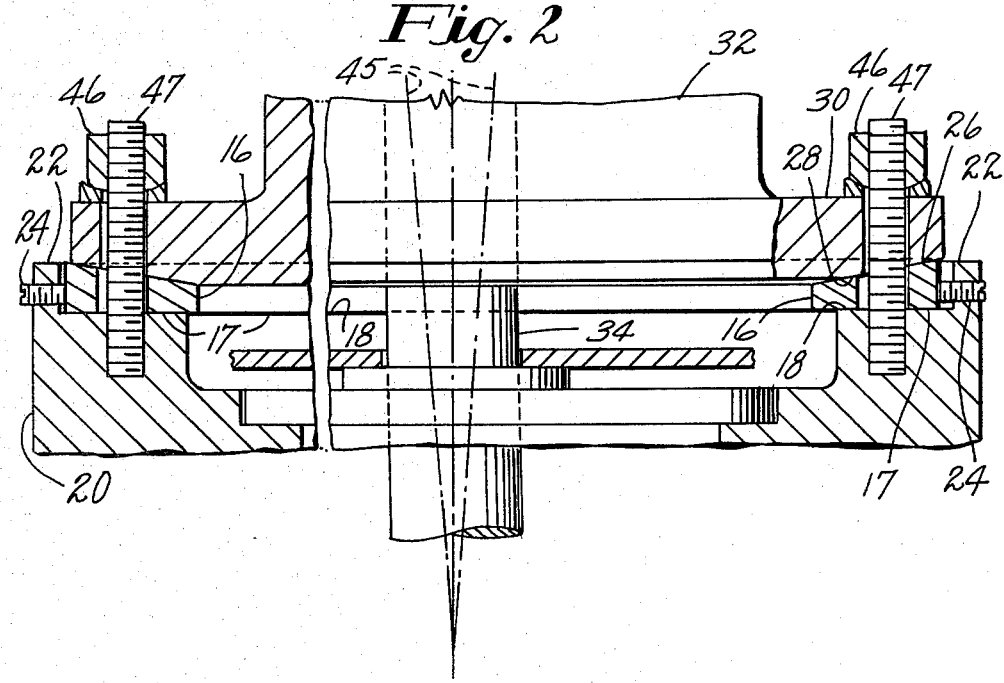
FIG. 2 is a view of the adjusting portion of the unit on an enlarged scale.

For adjusting the angular relation of the shaft 34 with respect to the surface of the die plate surface 6, the set screws 24 are adjusted to move the plate 16 along the ledge 18. The engagement between the wedge-like surfaces 26 and 28 causes the drive unit to be swung about a point 42 centrally of the packing 40. Since misalignment of the knife plane and the die surface is caused by accumulation of manufacturing tolerance, the misalignment while enough to cause rapid wear is usually only in the order of 0.1° to 0.2°. The change of angular adjustment of the shaft 34 with respect to the packing is not enough to distort the packing 40 sufficiently to cause leakage from the chamber 12. To illustrate the change of angle of the drive shaft 34 caused by adjustment the angle of the broken center lines 45 have been exaggerated on FIGS. 1 and 2 to illustrate how the angles vary about the point 42. After adjustment the cutter unit 32 is securely fixed to the housing 20 by nuts 46 on studs 47 extending from the housing through the mounting flange 30.

It should be apparent that the dispositions of the surfaces 26 and 28 could be inverted so that the ledge 18 would be sloped and the flat surface on the plate would be provided on the drive unit flange 30 without departing from the scope of the invention. Furthermore, other substitutions and combinations of parts could also be provided without departing from the scope of the invention defined in the appended claims.

Having thus described our invention what we claim as new and desire to secure by Letters Patent of the United States is:

1. In a pellet cutting apparatus in which one or more rotatable blades are adapted to cut plastic strands extruded through a cutting surface of a perforated die plate including:
 a housing support mounting the die plate for extrusion of material through said plate;
 a unit adjustably secured to said housing and mounting the blades for rotation along said cutting surface;
 means for aligning the plane of rotation of the blades with said cutting surface comprising an adjustable ring arranged between the housing and said unit, said ring having a wedge-like cross section forming a locating surface complementary to a mating surface on one of said unit and said support; and
 means for adjusting said ring relative to said support and said unit in directions generally parallel to said cutting surface thereby varying the angular relation of the support and the unit for aligning the plane of rotation of the blades with said cutting surface, said adjustment means comprising several set screws in registration with said ring and said support to permit manual regulation and adjustment thereof.

2. Apparatus according to claim 1 in which the complementary mating surface is provided on said knife mounting unit.

3. Apparatus according to claim 1 in which the locating surface and the complementary mating surface form truncated cones.

4. Apparatus according to claim 1 in which the cutting knives are carried by a rotatable shaft extending from said unit through a resilient packing bearing carried by the housing and the angular relative adjustment of the unit and housing occurs about a point substantially centered at said bearing.

* * * * *